(12) United States Patent
Oztaskent et al.

(10) Patent No.: US 9,204,189 B1
(45) Date of Patent: Dec. 1, 2015

(54) USING A CONDITIONAL ACCESS MODULE FOR TV VIEWERSHIP INFORMATION

(75) Inventors: Ant Oztaskent, Sutton (GB); Iain Merrick, London (GB); Simon Michael Rowe, Finchampstead (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/549,349

(22) Filed: Jul. 13, 2012

Related U.S. Application Data

(60) Provisional application No. 61/507,932, filed on Jul. 14, 2011.

(51) Int. Cl.
H04N 21/442 (2011.01)
H04N 21/418 (2011.01)
H04N 21/45 (2011.01)
H04N 21/4623 (2011.01)

(52) U.S. Cl.
CPC ....... H04N 21/44222 (2013.01); H04N 21/418 (2013.01); H04N 21/4532 (2013.01); H04N 21/4623 (2013.01)

(58) Field of Classification Search
CPC ............ H04N 21/44222; H04N 21/4532; H04N 21/4623; H04N 21/418
USPC ........................................... 725/9–21
See application file for complete search history.

(56) References Cited

U.S. PATENT DOCUMENTS

| 5,974,299 | A  | * | 10/1999 | Massetti ............................ 725/14 |
| 6,178,446 | B1 | * | 1/2001  | Gerszberg et al. ............ 709/217 |
| 6,356,311 | B1 | * | 3/2002  | Matsumoto et al. .......... 348/461 |
| 6,735,775 | B1 | * | 5/2004  | Massetti ............................ 725/14 |
| 7,012,963 | B2 | * | 3/2006  | Zdepski et al. ............ 375/240.27 |
| 7,483,975 | B2 | * | 1/2009  | Kolessar et al. ................. 725/10 |
| 7,664,946 | B2 | * | 2/2010  | Thomas et al. .................... 725/9 |
| 8,566,857 | B2 | * | 10/2013 | Putnam ............................ 725/22 |
| 2002/0112239 | A1 | * | 8/2002 | Goldman ............................ 725/9 |
| 2005/0027986 | A1 | * | 2/2005 | Thomas et al. ................. 713/176 |
| 2006/0184961 | A1 | * | 8/2006 | Lee et al. ........................ 725/32 |
| 2007/0050832 | A1 | * | 3/2007 | Wright et al. ................. 725/115 |
| 2007/0067794 | A1 | * | 3/2007 | Russell et al. ..................... 725/9 |
| 2007/0266400 | A1 | * | 11/2007 | Rogers et al. .................. 725/42 |
| 2008/0126420 | A1 | * | 5/2008 | Wright et al. ............. 707/104.1 |
| 2010/0011389 | A1 | * | 1/2010 | Lee et al. ........................ 725/14 |
| 2010/0131969 | A1 | * | 5/2010 | Tidwell et al. .................. 725/14 |
| 2011/0154405 | A1 | * | 6/2011 | Isaias ............................ 725/53 |
| 2012/0304210 | A1 | * | 11/2012 | Zaslavsky et al. ............. 725/14 |
| 2013/0007298 | A1 | * | 1/2013 | Ramaswamy et al. ........ 709/231 |

* cited by examiner

*Primary Examiner* — Randy Flynn
(74) *Attorney, Agent, or Firm* — Foley & Lardner LLP; John D. Lanza

(57) ABSTRACT

Methods and systems for determining and collecting information about channels being displayed on a display device are described. Such methods and systems provide an effective way for entities to collect reliable and detailed viewership information. Conditional access modules are associated with panelists who are part of a viewership measurement program. A conditional access module is also associated with a display device, and sends messages to a server. The messages include data that can be used to identify the channel to which the display device is tuned. The server collects and compiles data about a group of TV channels. The server determines a match between the stored data and the received message to determine what TV channel is being displayed at the display device.

26 Claims, 11 Drawing Sheets

Channel-Map Data 300

Tune-Data Entries 312

| Geographic Region Indicator 302 | Network Name 304 | Channel Number 305 | Mux Identifier 306 | Program Number 202 | Component Program Identifiers 204 | Start Time 308 | End Time 310 |
|---|---|---|---|---|---|---|---|
| Region 1 | BBC1 | 2 | A | Stream 1 | 100, 101 | 12:00AM | 11:59PM |
| Region 1 | BBC2 | 4 | A | Stream 2 | 102, 103 | 12:00AM | 11:59PM |
| Region 1 | BBC Kids | 5 | B | Stream 1 | 500, 501 | 9:00AM | 9:59PM |
| Region 1 | BBC3 | 6 | B | Stream 1 | 250, 251 | 10:00PM | 8:59AM |
| Region 1 | ITV1 | 9 | B | Stream 3 | 102, 103 | 12:00AM | 11:59PM |
| Region 2 | BBC1 | 1 | A | Stream 4 | 600, 601, 602, 603 | 12:00AM | 11:59PM |
| Region 2 | BBC2 | 2 | B | Stream 1 | 102, 103 | 12:00AM | 11:59PM |
| ... | | | | | | | |

USING A CONDITIONAL ACCESS MODULE FOR TV VIEWERSHIP INFORMATION

RELATED APPLICATION

This application claims priority to U.S. Provisional Patent Application No. 61/507,932, filed Jul. 14, 2011, which is hereby incorporated by reference in its entirety.

TECHNICAL FIELD

The present invention relates generally to detecting a TV channel being displayed to a user, and to collecting TV viewership information.

BACKGROUND

Many providers of television programming collect information about what shows or television channels are being watched by viewers. Such information is used, for example, to determine the popularity of particular television shows or channels, to analyze trends in entertainment or news, and to aid in determining pricing for television advertisements. Furthermore, in some cases, media providers benefit from having access to channel information of a channel being viewed by a particular user in order to customize a user experience based at least in part on that information. While media devices inside a user's home are typically able to identify the channel that is being displayed to a user at any given time, such information is rarely available to outside entities.

Accordingly, it is highly desirable to provide systems and methods for collecting television viewership information from individual televisions.

SUMMARY

The above deficiencies and other problems associated with collecting television viewership information from individual televisions are reduced or eliminated by the disclosed methods and devices.

Methods and systems for collecting television viewership information are described. Such methods and systems provide an effective way for entities to collect reliable and detailed viewership information. Some implementations provide a method for determining a channel being displayed at a display device, such as a television. A conditional access module has a network communication interface and is associated with a display device having a tuner. A program map message from the tuner is received at the conditional access module. The program map message includes component packet identifiers and a program number. The packet identifiers and the program number correspond to a TV channel tuned by the tuner, and displayed by the display device. The conditional access module forms a tune-data message including the component packet identifiers and the program number of the tuned TV channel. The conditional access module transmits, using the network interface, the tune-data message to a server for analysis. The analysis includes determining channel information of the tuned TV channel, such as a channel name or network name.

In accordance with some implementations, information about a TV channel being displayed at a display device is determined. A server receives a tune-data message from a conditional access module. The tune-data message includes component packet identifiers and a program number corresponding to a TV channel being displayed by a display device. The server determines whether information in the tune-data message matches stored TV channel information for a respective TV channel. The stored TV channel information includes at least a stored component packet identifier and a stored program number for the respective TV channel. When the server determines a match between the information in the tune-data message and the TV channel information for the respective TV channel, the server associates a channel identifier for the respective TV channel with the tune-data message (and thus the displayed TV channel). The server sends information about the tuned TV channel to the display device, or stores the information for the tuned TV channel in a database. Stored TV channel information can be associated with a particular panelist who is part of a TV viewership measurement program.

In accordance with some implementations, information about TV channels is determined. A server includes a tuner. A TV signal with component packet identifiers and a program number is tuned by the tuner. The server extracts meta-information associated with the tuned TV channel from the tuned TV signal. The server associates the component packet identifiers and the program number with the meta-information of the tuned TV signal. The server stores, in a database, the at least one component packet identifier and the program number in association with the meta-information.

BRIEF DESCRIPTION OF THE DRAWINGS

FIG. 3 is a block diagram illustrating an exemplary data structure of channel-map data, in accordance with some implementations.

Like reference numerals refer to corresponding parts throughout the drawings.

DETAILED DESCRIPTION

There is a need for a system to identify and, in some cases, track and measure (subject to viewer consent), information about TV content that is being viewed by individuals without requiring the individual viewers to record their viewing activities in a log and/or engage in a time-consuming log-in process prior to a viewing session. Implementations described herein identify and output TV content information for tuned TV programs when a viewer is viewing the programs using an electronic device, such as a set top box, television, or computer, that does not natively output such TV content information.

In some implementations, a user views TV programs and other media content on an electronic device that has both an over the air (OTA) tuner and a conditional access module (CAM), such as a cable card or other interface that implements the Common Interface (CI) Plus standard. These electronic devices do not output information on what channel a viewer is watching in a form that can be used by an external device to monitor TV viewership. However, when a viewer is viewing OTA TV programs and/or other media content on an electronic device that also includes a CAM, all of the tuned TV signals, even the TV signals that arrive as OTA signals, pass through the CAM. The CAM in turn is configured to recognize and output certain information related to the signals that can be used by a server or other computer to identify the channels being tuned/displayed. In some implementations, this information includes a set of one or more indices, referred to as program identifiers (IDs) (or PIDs), that identify respective components of a tuned TV signal. Program IDs for the tuned signal are transmitted by the CAM to a server (e.g., via the Internet) along with information that identifies where the CAM, and therefore the viewer, is located. Using the PIDs, the user or viewer location information, i.e., the CAM location information, and a lookup table that identifies PIDs associated with particular digital TV channels in particular geographical regions, the server determines the actual channel being displayed to the user. Based on this channel information and program guide information that identifies what programs are showing on particular channels, the server can update viewing statistics and/or serve content to the viewer that is related or complementary to the TV program on the channel being viewed.

Figure 1:
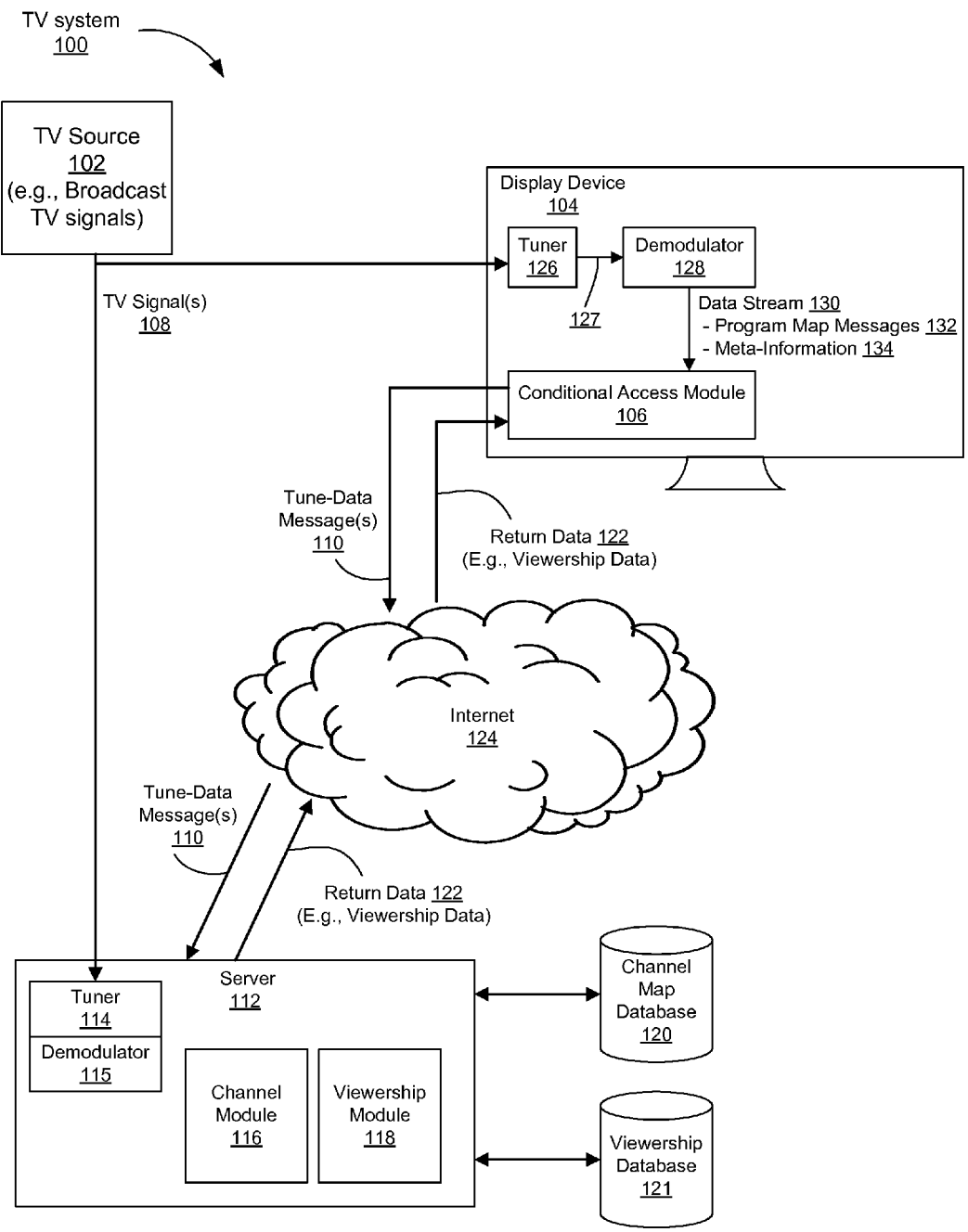
FIG. 1 is a block diagram illustrating the infrastructure of a TV system, in accordance with some implementations.

According to some implementations, a TV system 100 is provided for tracking and measuring television viewership data. As shown in FIG. 1, TV content is displayed to a user at a display device 104. A conditional access module 106 sends information associated with the displayed TV content (e.g., a displayed TV channel or TV program) to a server 112. The server 112 determines the TV channel or TV program being displayed, and stores the information. In some implementations, users of the conditional access modules 106 are part of a "TV measurement panel," where the users have consented to having their TV viewing history recorded or tracked for audience measurement and/or market analysis.

Attention is directed to FIG. 1, which is a block diagram illustrating the functional components of a TV system 100 in accordance with some implementations. The TV system 100 includes: a TV source 102, a display device 104, and a server 112. It should be appreciated that the TV system 100 can be implemented as separate components or as parts of a single component. For convenience of illustration and explanation, the TV system 100 is described below as being implemented as separate components.

The TV source 102 is a source of TV signal(s) 108. The TV signal(s) 108 can be any signal that carries TV content. As used herein, a TV signal is an electrical, optical, or other type of data transmitting signal that includes audio and/or video components corresponding to a TV channel. A TV signal 108 may correspond to a single TV channel. Alternatively, each respective TV signal 108 may correspond to multiple TV channels. For example, a TV signal 108 may be a multiplex broadcast that includes multiple TV channels, as well as other data (such as program guides, etc.). In some implementations, the TV signals 108 carry video and audio content for presentation on the display device 104.

In some implementations, the TV source 102 is a terrestrial over-the-air TV broadcast. In some implementations, the TV source 102 is a satellite TV source. In some implementations, a TV signal corresponding to a single TV channel is transmitted over the air on a single frequency. In some implementations, multiple TV signals corresponding to multiple TV channels are transmitted over a single frequency using multiplexing techniques.

The display device 104 is any display for presenting video and/or audio content to a user. In some implementations, the display device 104 is a television. In some implementations, the display device 104 is a television set connected to (or including) a digital tuner. In some implementations, the display device 104 is a computer monitor, LCD screen, tablet computer, mobile telephone, projector, and/or any other type of video display system.

In some implementations, the display device 104 includes a tuner 126 that tunes a respective TV signal 127 from the TV signals 108. The tuner 126 then provides the tuned TV signal 127 to a demodulator 128 that extracts or recovers a data stream 130 from the TV signal. The data stream 130 contains video and/or audio content (corresponding to the tuned TV signal) that can be displayed by the display device 104. In some implementations, the data stream 130 includes a video sub-stream corresponding to a video component of a TV channel and an audio sub-stream corresponding to an audio component of a TV channel. In some implementations, the data stream 130 includes additional sub-streams. In some implementations, the data stream 130 conforms to a specified and/or standardized data format such as the MPEG-2 standard. Audio and video sub-streams are discussed in greater detail herein with respect to FIG. 2A.

The display device 104 also includes a conditional access module 106, or CAM 106. The CAM 106 receives, and in some instances decodes, the data stream 130 from the demodulator 128. In some implementations, the CAM 106 is a separate unit from the display device 104, but is connected to the display device 104 via a communication interface, described in greater detail herein with reference to FIG. 4.

In some implementations, the CAM 106 includes communication capabilities for communicating with other devices such as the server 112 (e.g., via the Internet 124). In some implementations, the CAM 106 includes a network communication module for communicating with other devices, as described in greater detail herein with reference to FIG. 4.

In some implementations, the CAM 106 also enables a user to view encrypted "conditional access" content, such as premium or Pay-Per-View TV channels that have no OTA counterpart, channels in high-definition format, or other satellite or digital television transmissions. For example, in some implementations, the CAM 106 decodes these signals only if a user has subscribed to a service or paid to view a particular channel or broadcast.

Figure 2A:
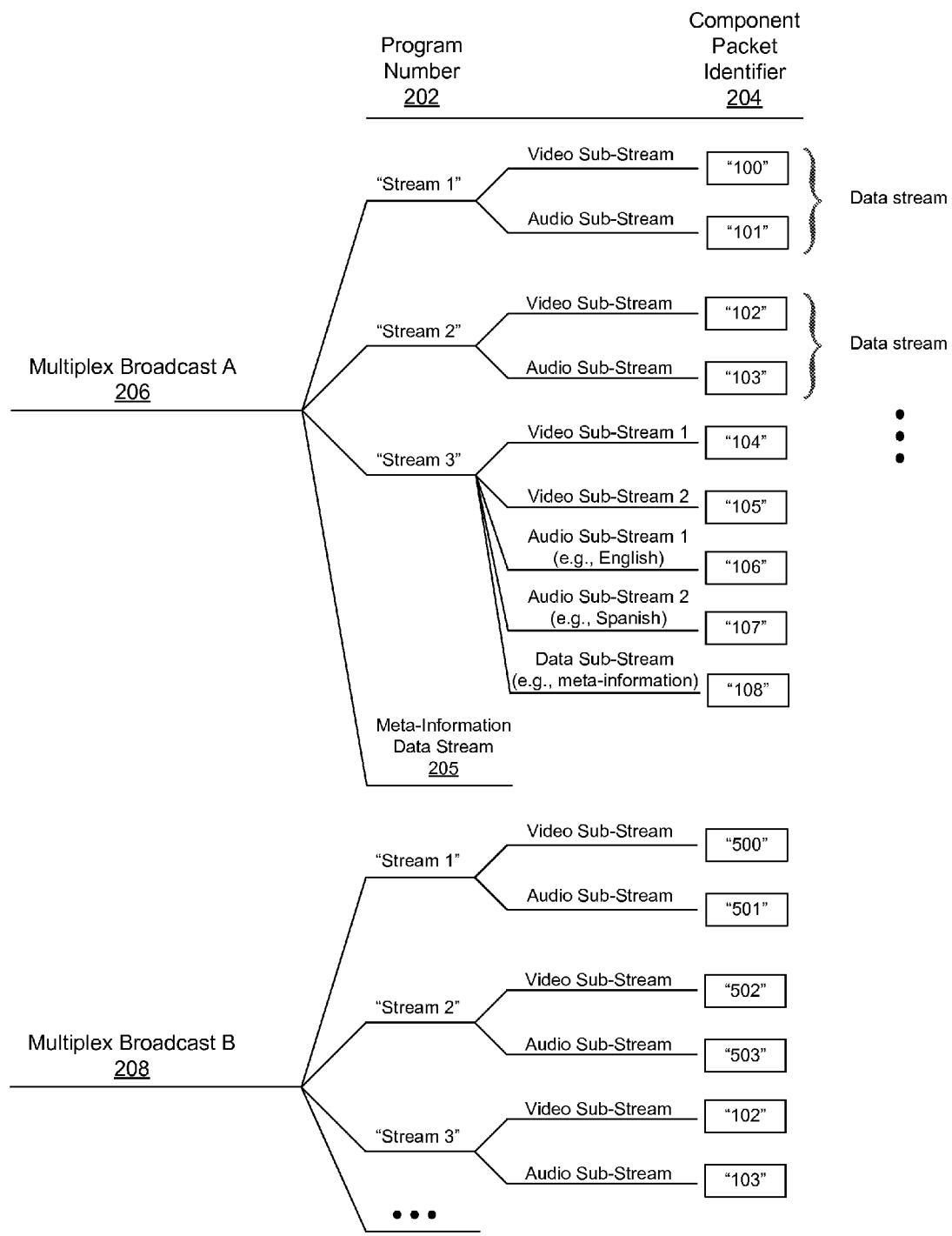
FIG. 2A is a diagram illustrating multiplex broadcasts, in accordance with some implementations.

In some implementations, the data stream 130 received by the CAM 106 includes program map messages 132. Program map messages 132 include a program number, which is a semi-unique identifier for the data stream 130. Program numbers are discussed in greater detail herein with reference to FIG. 2A. In some implementations, the program map messages 132 include one or more component packet identifiers. A component packet identifier, discussed in greater detail with reference to FIG. 2A, is a semi-unique identifier for at least a portion of the data stream 130 (e.g., an audio or video sub-stream).

In some implementations, the data stream 130 received by the CAM 106 includes tuned-channel meta-information 134 associated with a displayed TV channel. For instance, in some implementations, the data stream 130 includes tuned-channel meta-information 134 including channel information (e.g., a channel number or a channel/network name, etc.), and program information (e.g., a program name, the name of an actor in the program, etc.). Tuned-channel meta-information 134 is described in greater detail herein with reference to FIG. 2C.

The CAM 106 forms tune-data message(s) 110 containing information (including program numbers and component packet identifiers) that can be used to identify the TV channel being displayed on the display device 104. Because the tune-data message(s) 110 include component packet identifiers and program numbers from the data stream 130, it is typically possible for another device (such as the server 112) to identify what TV channel is being displayed on the display device 104. In other words, and as described in greater detail herein, the tune-data message 110 contains identifying information for the channel that is being displayed by the display device 104, or being recorded by an integrated or attached TV recording device, such as a DVR. An exemplary tune-data message 110 is described in greater detail herein with reference to FIG. 2C. In some implementations, the tune-data message 110 includes tuned-channel meta-information 134 associated with the channel being displayed or recorded.

While the tune-data message 110 contains information that can be used to identify the TV channel being displayed on a display device 104, it does not necessarily contain a single, globally unique indicator of the channel being displayed, such as a name of the channel or network being viewed (e.g., "BBC1" or "NBC"). Some implementations for determining the specific TV channel or network associated with a tune-data message 110 are described in greater detail herein. Such methods are not always necessary, however, if a tune-data message 110 includes in the optional tuned-channel meta-information 134 a globally unique indicator of the displayed TV channel or TV program.

The tune-data message(s) 110 are sent to the server 112, e.g., via the Internet 124. In some implementations, the server 112 receives the tune-data message(s) 110 and determines the TV channel that corresponds to the tune-data message(s) 110.

In some implementations, the server 112 includes a tuner 114, a demodulator 115, a channel module 116, and a viewership module 118. In some implementations, the server 112 includes a channel map database 120 and a viewership database 121.

The tuner 114 can be tuned to a plurality of TV signals, such as the TV signal(s) 108. In some implementations, the tuner 114 receives any available broadcast TV signals, satellite TV signals, etc. In some implementations, the tuner 114 is connected to one or more antennas for receiving over-the-air broadcast signals, and/or one or more satellite antennas for receiving satellite broadcast signals. In some implementations, the demodulator 115 is configured to extract or recover one or more data streams from each of the TV signal(s) 108. A data stream recovered by the demodulator 115 has the same components as the data stream 130 described above, including a program number and component packet identifiers corresponding to the TV channel carried by a respective one of the TV signals 108. Furthermore, in some implementations, the data stream includes tuned-channel meta-information 134 for each channel carried by the TV signal(s) 108. In some implementations, the TV signal(s) 108 include a data component with a list of all of the channels transmitted on the various TV signal(s) 108. For example, a TV signal 108 may be a multiplex broadcast that contains a data stream with a list of all the channels on that multiplex broadcast (as well as meta-information associated with the channels).

In some implementations, the server 112 receives with the tuner 114 a plurality of TV signals (e.g., TV signal(s) 108), demodulates the TV signals to extract or recover a plurality of data streams corresponding to respective TV channels, and stores tune-data corresponding to each of the received data streams in the channel map database 120. For example, in some implementations, the server 112 stores in the channel map database 120 program numbers and component packet identifiers in conjunction with a unique indicator of the tuned TV channel (such as the name of the network carried by the tuned TV signal.) In some implementations, the unique indicator is determined by consulting the tuned-channel meta-information 134 of an extracted data stream. The channel map database 120 is described in greater detail herein with reference to FIG. 3.

The server 112 includes a channel module 116. In some implementations, the channel module 116 receives a tune-data message 110 from a CAM 106. The channel module 116 uses the tune-data message 110 to determine what channel is being displayed to a user on the display device 104. In some implementations, the channel module 116 uses the information in the tune-data message 110 and the information in the channel map database 120 (e.g., channel-map data 300, FIG. 3) to determine the channel that corresponds to that particular tune-data message 110, and therefore, what channel is being displayed on the display device 104. In some implementations, the channel module 116 compares the program number and/or component packet identifiers from the tune-data message 110 to program numbers and/or component packet identifiers stored in the channel map database 120 to determine the channel corresponding to the tune-data message 110.

The server 112 also includes a viewership module 118. The viewership module 118 receives tune-data messages 110 from the CAM 106, and stores information from the tune-data messages 110 in the viewership database 121. In some implementations, the viewership database 121 compiles and stores channel viewership statistics, program viewership statistics, or viewing statistics of particular users or households. Such data may be used, for example, in determining the popularity of TV shows or networks, determining advertising prices based on viewership data, and/or reporting popularity metrics to interested parties, such as viewers and TV networks.

In some implementations, the server 112 sends return data 122 to the CAM 106. In some implementations, the return data 122 includes TV viewership data, closed caption streams, subtitle streams, alternate language audio tracks, and/or program recommendations. In some implementations, the above described information items are displayed on the display device 104.

In some implementations, viewership data returned to the CAM 106 is displayed to a user to indicate the popularity of certain TV channels and/or TV programs. Such viewership data is sometimes tailored to a specific geographic region where the CAM 106 (and therefore the viewers of the display device 104 associated with the CAM 106) resides. In some implementations, program recommendations are based, at least in part, on general viewership statistics for a particular TV channel or TV program. In some implementations, program recommendations are based, at least in part, on historical viewership data for an individual CAM 106 (and therefore the viewer(s) of the display device 104 associated with the CAM 106).

The specific methods by which the server 112 identifies the channel associated with a particular tune-data message 110 are described in greater detail below. However, the following description illustrates exemplary relationships between broadcast multiplexes (or "Muxes"), program numbers, and component packet identifiers that are useful for the methods described herein.

FIG. 2A illustrates an exemplary multiplexing scheme used in TV broadcasting, demonstrating the relationship between broadcast multiplexes, program numbers, and component packet identifiers (or "PIDs"). The following description is merely exemplary, and the ideas disclosed in the present application are not limited to the specific broadcasting context described.

In particular, FIG. 2A illustrates two exemplary multiplex ("Mux") broadcasts, multiplex broadcast A 206 ("Mux A 206") and multiplex broadcast B 208 ("Mux B 208"), that are broadcast by the TV source 102 in some implementations. Multiplex broadcasting techniques are well known in the art of telecommunications, and provide a method for combining multiple signals or data streams into one signal or frequency. For example, several individual TV channels may be carried on a single Mux.

Each mux broadcast 206, 208 includes data streams for several individual channels. A data stream typically corresponds to an individual TV channel or TV network at any given time. Each data stream is associated with a single program number 202 (e.g., stream 1, stream 2, stream 3, etc.). In some implementations, the program number 202 is a number (e.g., a binary representation of a number).

In some implementations, the program number 202 is contained in, or is a component of, a data stream corresponding to the MPEG-2 standard. In some implementations, the program number 202 is a "program_number" component from an MPEG transport stream. In some implementations, the program number 202 is represented by a 16 bit binary identifier. However, for ease of reference in the present description, the program numbers 202 are sometimes described as "stream 1" and "stream 2," etc. In some implementations, the program number 202 is any semi-unique identifier for any type of data (e.g., a signal, a stream, a media file, etc.) corresponding to a TV channel.

Additionally, a mux broadcast typically contains at least one meta-information data stream 205 containing meta-information for each of the TV channels in the Mux. The meta-information may include channel information and TV program information for each respective TV channel in the Mux. Furthermore, the meta-information may be associated with the individual program numbers 202 and the component packet identifiers 204 for each data stream. For example, the combined meta-information may indicate that "Stream 3" in Mux A 206 corresponds to the network "ITV2," and contains a video sub-stream with a component packet identifier of "104," an audio sub-stream with a component packet identifier (PID) of "106," etc.

As shown in FIG. 2A, a single broadcast mux contains only one "stream 1," and only one "stream 2," etc. However, Mux A 206 and Mux B 208 have overlapping program numbers 202. In other words, both mux broadcasts 206, 208 have a "stream 1," and a "stream 2," etc. Accordingly, a program number 202 uniquely identifies a data stream within a Mux, but does not uniquely identify a data stream among several Muxes. For example, each Mux typically has a data stream with a program number 202 of "stream 1," and it is unlikely that each "stream 1" from the various Muxes corresponds to the same TV channel or TV network.

In some implementations, a data stream corresponds to a single TV channel or TV network. However, as described in greater detail herein with reference to FIG. 3, more than one TV network may share a data stream at different times of the day.

Each mux broadcast 206, 208 also includes a plurality of component packet identifiers, or PIDs 204. A component packet identifier 204 identifies one or more audio and video sub-stream in each data stream. In some implementations, a component packet identifier 204 is a number (e.g., a binary representation of a number).

In some implementations, the component packet identifier 204 is contained in, or is a component of, a data stream corresponding to the MPEG-2 standard. In some implementations, the component packet identifier 204 is a PID component from an MPEG transport stream. In some implementations, the component packet identifier 204 is any semi-unique identifier for any type of data (e.g., a signal, a stream, a media file, etc.) corresponding to a TV channel.

Data streams within a Mux typically include at least one video sub-stream containing a signal corresponding to the video component of a TV channel. Data streams sometimes include multiple video sub-streams.

Data streams within a Mux also typically include at least one audio sub-stream corresponding to the audio component of a TV channel. Data streams sometimes include multiple audio sub-streams, where each audio sub-stream corresponds to an audio track in a different language.

Data streams within a Mux also may include at least one data sub-stream. A data sub-stream can include meta-information, such as channel information or TV program information associated with the data stream.

Each sub-stream in a data stream has a different component packet identifier 204. For example, Mux A 206 includes "stream 1," which in turn includes a video sub-stream identified by the component packet identifier of "100," and an audio sub-stream identified by the component packet identifier of "101." Each component packet identifier 204 is unique within a data stream, and within a Mux. That is, no two sub-streams in a single Mux will have identical component packet identifiers. Often, component packet identifiers are unique to a data stream even between many Muxes. In other words, even where there are many mux broadcasts, each having multiple data streams and multiple sub-streams, there still may be only one sub-stream among them having a component packet identifier of "100." Accordingly, it is sometimes the case that a component packet identifier 204 uniquely identifies a sub-stream among all of the multiplex broadcasts available in a particular geographic region. Because a sub-stream corresponds to the content of a TV channel, it is often possible to relate a particular component packet identifier 204 to a particular TV channel or TV network (e.g., the component packet identifier "100" relates to "BBC1.")

Sometimes, however, the component packet identifiers 204 are not unique between multiplex broadcasts. For example, as shown in FIG. 2, Mux A 206 includes "stream 2," which in turn includes sub-streams with component packet identifiers of "102" and "103." Mux B 208 includes "stream 3," which also includes sub-streams with component packet identifiers of "102" and "103." Thus, these component packet identifiers likely do not uniquely identify a single TV channel or TV network. However, where two or more multiplexes include overlapping component packet identifiers 204 (e.g., sub-streams "102" and "103"), it is often the case that the overlapping component packet identifiers are part of data streams with different program numbers (e.g., "stream 2" in Mux A 206, and "stream 3" in Mux B 208). Accordingly, it is often possible to use the combination of the program number 202 and the component packet identifier 204 associated with a particular data stream in order to disambiguate overlapping component packet identifiers 204 to an individual TV channel or TV network.

In some implementations, it is possible to disambiguate overlapping component packet identifiers 204 based on knowledge of the audio sub-streams associated with a received data stream. For example, it may be known (e.g., at a server) that BBC1 broadcasts four different audio sub-streams in their data stream, and that ITV1 broadcasts two different audio sub-streams. Thus, even if BBC1 and ITV1 both use the same component packet identifiers 204 to identify their video sub-stream (e.g., a component PID of "100"), it is possible to determine that the data stream containing four audio sub-streams is BBC1. In another example, two networks or channels may have common component packet identifiers 204 for their video sub-streams, but different component packet identifiers 204 for their audio sub-streams. Specifically, BBC1 and ITV1 may have a component packet identifier of "100" for a video sub-stream, but the audio sub-stream component PID for BBC1 may be "101", where the component PID for ITV1 is "201". Thus, it is possible to determine which data stream corresponds to which network based on the component PIDs of both the video and audio sub-streams.

Figure 2B:
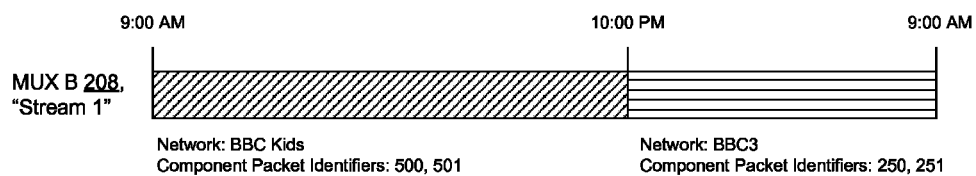
FIG. 2B is a diagram illustrating two networks on a multiplex broadcast stream, in accordance with some implementations.

FIG. 2B is a diagram illustrating how multiple TV channels or TV networks may share a single data stream within a Mux (corresponding to an individual program number 202) at different times during a single 24 hour period. FIG. 2B represents one possible example of "stream 1" from Mux A 206. The TV network "BBC Kids" is shown as being transmitted over "stream 1" between the hours of 9:00 AM and 10:00 PM. The hypothetical component packet identifiers associated with the sub-streams for the "BBC Kids" network are "500" and "501." At 10:00 PM, the TV network "BBC 3" begins transmission over "stream 1," and remains active until 9:00 AM. The component hypothetical packet identifiers associated with the sub-streams for the "BBC 3" network are "250" and "251."

Figure 2C:
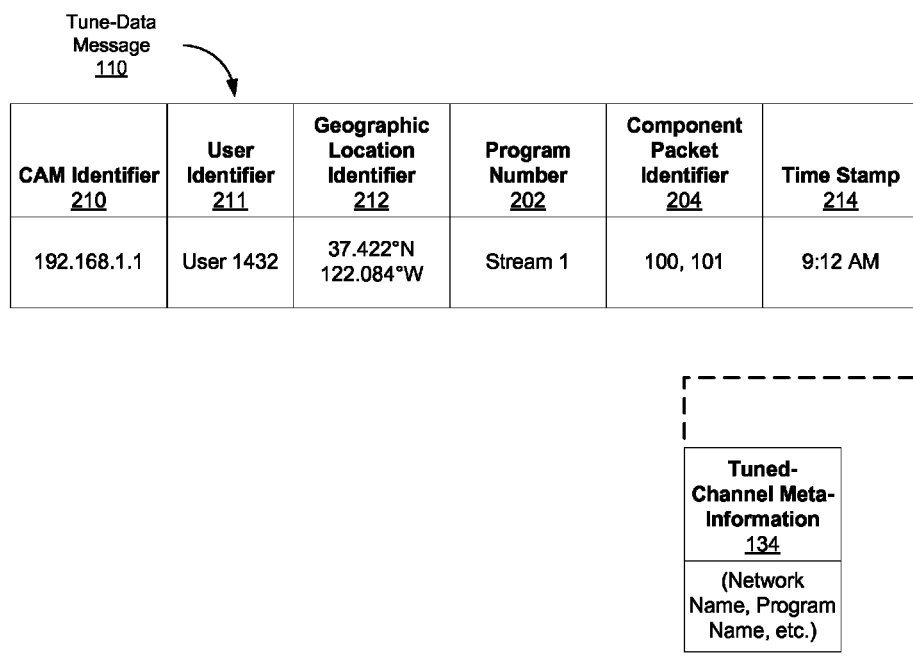
FIG. 2C is a block diagram illustrating components of a data message, in accordance with some implementations.

FIG. 2C is a block diagram illustrating a tune-data message 110, according to some implementations. As noted above, a tune-data message 110 is sent from the display device 104 to the server 112 to indicate information about the tuned channel, and includes a program number 202 and one or more component packet identifiers 204.

In some implementations, the tune-data message 110 includes a unique (or semi-unique) CAM identifier 210. In some implementations, the CAM identifier 210 is an address associated with the CAM 106 (e.g., an IP address, MAC address, serial number, etc.). In some implementations, the CAM identifier 210 uniquely identifies a CAM 106 to a server, such as server 112. In some implementations, a CAM 106 is associated with a particular user or panelist who has agreed to allow his or her TV viewership to be monitored. In some implementations, the tune-data message 110 includes a unique user identifier 211, such as a user-name, email address, user ID, or user number that uniquely identifies the particular user or a particular household with which the CAM 106 is associated.

In some implementations, the tune-data message 110 includes a geographic location identifier 212 (e.g., a city, county, region, or country, GPS coordinates, etc.). The geographic location identifier 212 is discussed in greater detail below with reference to FIG. 4. In some implementations, the tune-data message 110 includes a time stamp 214 corresponding to the time that the tune-data message 110 was created and/or the time that the TV channel corresponding to the data stream 130 was displayed on the display device 104. In some implementations, the tune-data message includes tuned-channel meta-information 134, which includes channel information (e.g., a channel number or a channel/network name, etc.), and program information (e.g., a program name, the name of an actor in the program, etc.) relating to the tuned TV channel.

The above described relationship between Muxes, data streams, and sub-streams is effectively utilized in some implementations of the instant application in order to determine what channel is associated with a tune-data message 110 sent by a CAM 106. This is needed because a CAM only knows the PID to which it is tuned—it is not aware of the corresponding channel number. In particular, the server 112 stores (e.g., in the channel map database 120) channel-map data that maps an individual TV channel or TV network to particular program numbers 202 and component packet identifiers 204. Thus, the information in a tune-data message 110 can be compared with the data in the channel map database 120 to determine the channel associated with that particular tune-data message 110, and therefore, what TV network was displayed on the display device 104 from which the tune-data message 110 came.

Figure 2D:
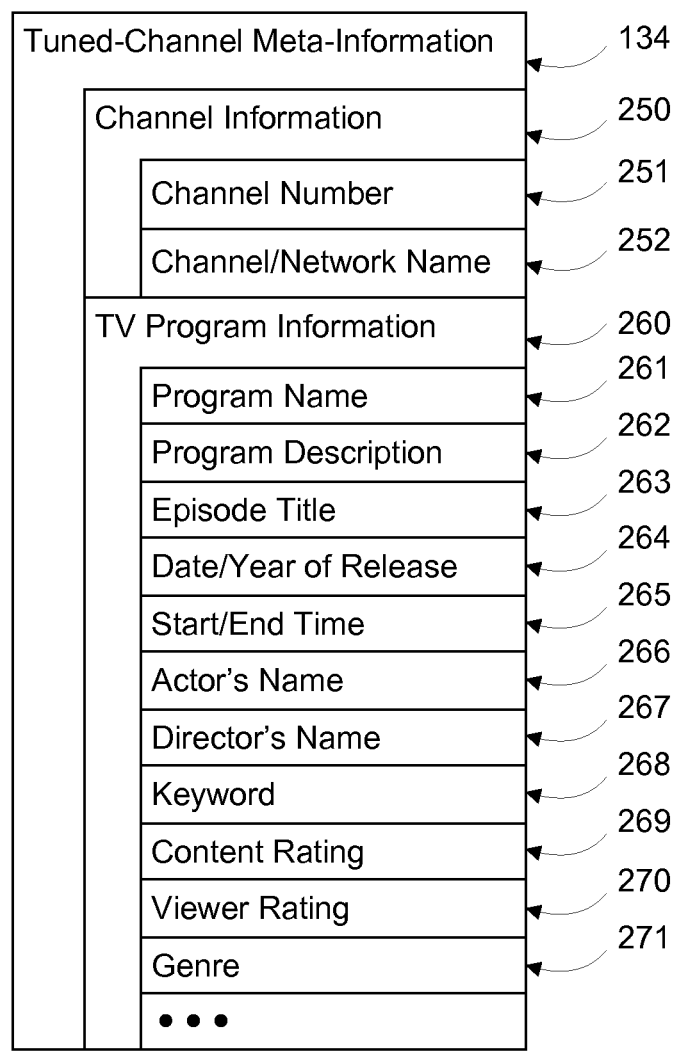
FIG. 2D is a block diagram illustrating an exemplary data structure of meta-information, in accordance with some implementations.

FIG. 2D is a block diagram illustrating tuned-channel meta-information 134 according to some implementations. In some implementations, the tuned-channel meta-information 134 includes channel information 250 associated with a TV channel being displayed to a user. In some implementations, channel information 250 includes the channel number 251 (e.g., "1") and the channel or network name 252 (e.g., "BBC1") associated with the TV channel being displayed to a user. In some implementations, the tuned-channel meta-information 134 includes TV program information 260 associated with the particular TV program being carried by the TV channel being displayed to a user. For instance, in some implementations, the TV program information 260 includes a program name 261, a program description 262, an episode title 263, a date or year of release 264, a start and/or an end time for the program 265, an actor's name 266, a director's name 267, a keyword 268, a content rating 269, a viewer rating 270, a genre 271.

In some implementations, a respective data stream from a TV signal 108 includes tuned-channel meta-information 134 for the channel corresponding to that respective data stream. In some implementations, a respective multiplex broadcast includes meta-information for all or substantially all of the channels broadcast on that respective multiplex broadcast.

FIG. 3 illustrates an exemplary data structure storing channel-map data 300 in the channel map database 120, according to some implementations. Each tune-data entry 312 in the channel-map data 300 includes a geographic region indicator 302, a network name 304, a channel number 305, a Mux identifier 306, a program number 202, one or more component program identifiers 204, a start time 308, and an end time 310.

The geographic region indicator 302 indicates that a channel-map data entry (corresponding to a single row in FIG. 3) is related to, or valid within, a particular geographic region. For example, in different geographic regions, a given channel may be broadcast over different Muxes, with different program numbers 202 and component packet identifiers 204. Accordingly, in some implementations, when determining the channel associated with a particular tune-data message 110, the server 112 limits the candidate channel-map data 300 to those entries with geographic regions matching or encompassing the geographic location identifier 212 contained in the tune-data message 110.

The network name 304 indicates which network (e.g., BBC1, ITV1, etc.) is associated with a particular tune-data entry 312.

The channel number 305 indicates the TV channel number on which a particular network is broadcast. Channel numbers 305 may be region specific. For example, in FIG. 3, channel "2" in "Region 1" corresponds to the network BBC1, but in "Region 2," channel "2" corresponds to the network BBC2. A channel number 305 associated with a data stream within a TV signal can be determined by one or more tuning parameters of a TV tuner.

The Mux identifier 306 indicates the Mux on which a particular TV network is broadcast. For example, in a certain geographic region, BBC1 may be broadcast on a Mux identified as "Mux A."

The program number 202, as described above, identifies the data stream within a Mux associated with a particular TV channel.

The component program identifiers 204, as described above, identify one or more audio and video sub-streams in each data stream associated with a particular TV channel.

The start time 308 and the end time 310 indicate when a particular TV network is active on a data stream. For example, in channel-map data 300, the TV network "BBC 1" is active on "stream 1" in "Mux A" from 12:00 AM to 11:59 PM. In cases where more than one TV network shares a data stream, the start time 308 and end time 310 indicate the active times of each TV network. For example, "BBC Kids" is active on "stream 1" on "Mux B" from 9:00 AM to 9:59 PM on any given day. Then, "BBC 3" is active on the same data stream from 10:00 PM to 8:59 AM.

Figure 4:
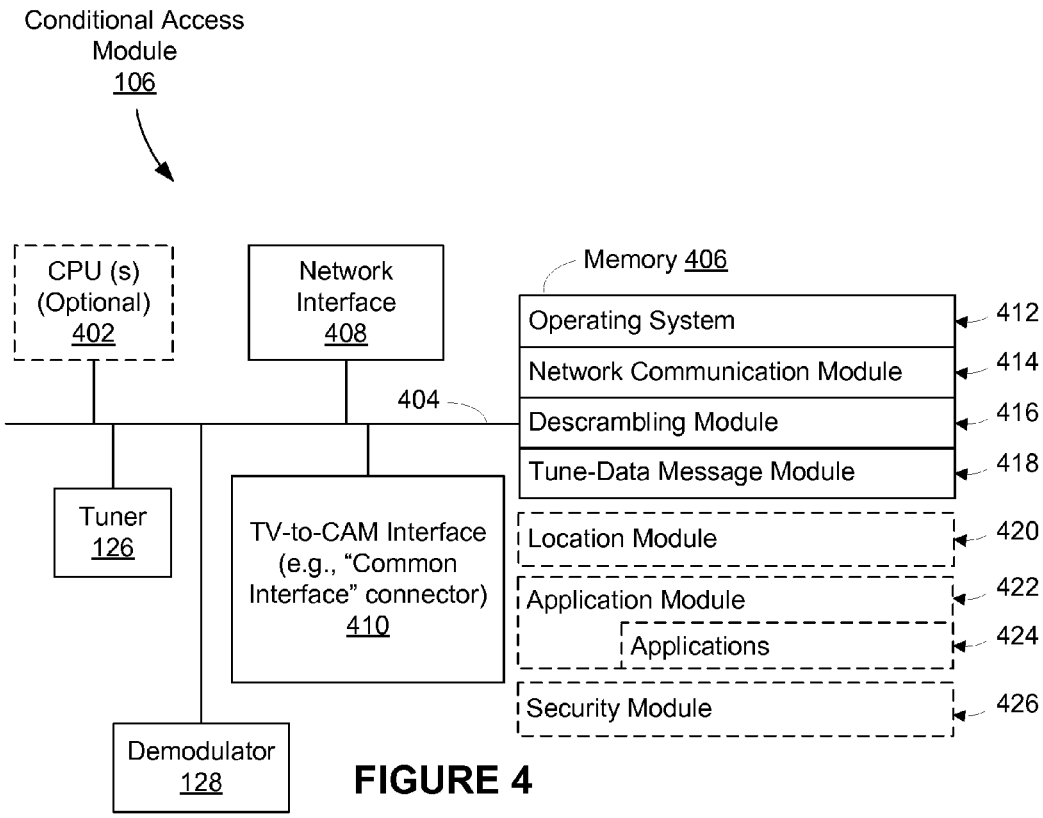
FIG. 4 is a block diagram illustrating a structure of a conditional access module, in accordance with some implementations.

FIG. 4 is a block diagram illustrating one implementation of the CAM 106. The CAM 106 is an electronic device that optionally includes one or more processing units (CPU(s)) 402, one or more network or other communications interfaces 408, a TV-to-CAM communication interface 410, memory 406, and one or more communication buses 404 for interconnecting these components. In some implementations, CAM 106 conforms to PC Card or PCMCIA standards for physical dimensions and/or electrical interface specifications.

In some implementations, the TV-to-CAM interface 410 is configured to receive the data stream 130, including the program map messages 132, from the display device 104 (e.g., from the demodulator 128). In some implementations, the TV-to-CAM interface 410 is an interface conforming to the Common Interface interconnect standard (EN 50221-1997). In some implementations, the TV-to-CAM interface 410 conforms to PC Card or PCMCIA standards for physical dimensions and/or electrical interface specifications. In some implementations, the CAM 106 is physically and electrically coupled to the display device 104, for example, with the TV-to-CAM interface 410. In some implementations, the CAM 106 is physically and electrically coupled to a set top box, such as a cable/satellite receiver, a DVR, or another peripheral component, which communicates with the display device 104.

The memory 406 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 406 may optionally include one or more storage devices remotely located from the optional CPU(s) 402. The memory 406, including the non-volatile and volatile memory device(s) within the memory 406, comprises a computer readable storage medium. In some implementations, the memory 406 or the non-transitory computer readable storage medium of the memory 406 stores the following programs, modules and data structures, or a subset thereof including an operating system 412, a network communication module 414, a descrambling module 416, a tune-data message module 418, and optionally, a location module 420 an application module 422, and a security module 426.

The operating system 412 includes procedures for handling various basic system services and for performing hardware dependent tasks.

The network communication module 414 facilitates communication with other devices via the one or more communication network interfaces 408 (wired or wireless) and one or more communication networks, such as the Internet 124, other wide area networks, local area networks, metropolitan area networks, wifi networks, and so on. In some implementations, the network interface 408 is configured to facilitate communications over a cellular data network.

The descrambling module 416 descrambles and/or decrypts data streams (or sub-streams) that are received by the display device 104 in a scrambled or encrypted state. Some data streams (or sub-streams) are broadcast in a scrambled or encrypted state, and are only viewable on a display device after the signal is descrambled or decrypted. For example, a TV service provider may broadcast special TV channels, TV networks, TV programs that are only available on a subscription or pay-per-view basis, or channels in high-definition format. Conditional access modules are designed to descramble or decrypt these "conditional access" content items if the user is authorized to receive and view them. Accordingly, the descrambling module 416 descrambles and/or decrypts such "conditional access" content items. In some implementations, the descrambling module 416 descrambles and/or decrypts a TV signal 108 (received from the tuner 126) before sending the data stream 130 to the CAM 106.

The tune-data message module 418 receives the data stream 130, including the program map messages 132, and forms the tune-data messages 110. An example of a tune-data message 110 formed by an implementation of the tune-data message module 418 is discussed above with reference to FIG. 2C.

In some implementations, the tune-data message module 418 extracts a program number 202 and one or more component packet identifiers 204 from the program map messages 132, and forms a tune-data message 110 including these components. In some implementations, the tune-data message module 418 receives a geographic location identifier 212 from a location module 420 and includes the geographic location identifier 212 in the tune-data message 110.

The optional location module 420 identifies and provides to the tune-data message module 418 a geographic location identifier 212. The geographic location identifier 212 corresponds to a geographic location of the CAM 106. In some implementations, the location module 420 is a geosynchronous positioning system (GPS) device that acquires a geographic location (e.g., latitude and longitude coordinates) of the CAM 106. In some implementations, the location module 420 uses other techniques to determine the geographic location of the CAM 106. For instance, in some implementations, the location module 420 uses cellular triangulation (in conjunction with a network interface 408 configured for cellular communication) to determine the latitude and longitude (or another geographic indicator) of the CAM 106.

In some implementations, the location module 420 acquires Media Access Control (MAC) addresses of nearby wireless internet devices, such as wireless routers, which can be included in a tune-data message 110. The MAC addresses are then received by the server 112, and can be mapped to a list of MAC addresses for devices with known geographic locations. Accordingly, the server 112 can identify the geographic location of the CAM 106 using the MAC addresses of nearby wireless internet devices as a geographic location identifier 212.

In some implementations, the location module 420 receives a geographic location identifier 212 from a user, for example, during a CAM initialization or setup process. For instance, a user may be prompted during the setup of the CAM 106 to specify a geographic indicator such as a city, county, country, region, and/or any other geographic location indicator. In some implementations, the location module 420 stores the user's selection and provides it to the tune-data message module 418 for inclusion in a tune-data message 110.

In some implementations, the data stream 130 received by the CAM 106 includes an "original network ID" and a "transport stream ID," which uniquely identify the transmitter that originated the TV signal 108. By consulting a table correlating known transmitters with "original network IDs" and "transport stream IDs," the server 112 can identify the geographic location or region of the CAM 106 that sent the tune-data message 110.

As noted above, conditional access modules in accordance with the present disclosure can be distributed to registered panelists as part of a viewership measurement program. As part of the registration process, panelists are required to provide their address or an indication of the geographic region where they live. The panelists' addresses can then be mapped to a unique CAM identifier of the specific CAM that is assigned to them (e.g., a MAC address of the CAM). Thus, when a tune-data message 110 is received, the server 112 can retrieve the geographic location of the originating CAM using the CAM identifier 210 as an index. In some implementations, the CAM identifier 210 is an IP address of the CAM 106. Accordingly, techniques are sometimes used to identify the geographic location of a CAM 106 by tracing the IP address in the tune-data message 110 (or an IP address associated with a router or other network device associated with the geographic origin of the tune-data message 110) to a particular geographic region.

In some implementations, the CAM 106 includes an application module 422. The application module 422 includes, and is configured to execute, one or more applications 424, described in greater detail herein with reference to FIG. 5.

In some implementations, the CAM 106 includes a security module 426. Because the tune-data message 110 contains information that can be used to identify what TV channels or programs a user is viewing, it is sometimes beneficial to provide data security measures to help limit unauthorized access to that information. Accordingly, the security module 426 encrypts or otherwise protects the tune-data message 110 so that devices other than the server 112 cannot access or decipher the tune-data message 110. Because most encryption techniques cannot prevent all unauthorized access to the encrypted data, it is understood that the encryption methods in these implementations conform to standard encryption techniques.

Figure 5:
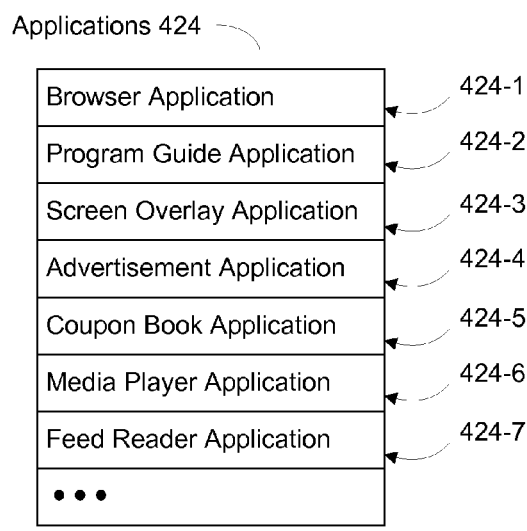
FIG. 5 is a block diagram illustrating further details of FIG. 4, in accordance with some implementations.

FIG. 5 is a block diagram illustrating the applications 424-i, in accordance with some implementations of the present invention. The application module 422 includes, and is configured to execute, one or more of the applications 424-i. In some implementations, the applications 424 include graphical user interfaces that are presented to a user on the display device 104. For example, executing the applications 424 includes displaying information to a viewer on the display device 104, and, in some implementations, receiving user-input from input devices such as a TV remote control.

In some implementations, the one or more applications 424-i include a browser application 424-1, a program guide application 424-2, a screen-overlay application 424-3, an advertisement application 424-4, a coupon book application 424-5, a media player application 424-6, and/or a feed reader application 424-7. In some implementations, the one or more applications 424-i receive, and execute in accordance with, meta-information from the return data 122.

For example, in some implementations, the application module 422 invokes and executes the coupon book application 424-5 to display a coupon to a user based on meta-information (including, in some implementations, the channel number or the network name, or TV program information). In some implementations the coupon book application 424-5 stores coupons for later use, either online or at a physical store. In another example, the application module 422 invokes and executes the advertisement application 424-4 to display an advertisement to a user based on the channel being viewed or the specific program that the user is watching.

In some implementations, one or more of the applications 424-i are downloaded from a server 112 based on the meta-information associated with the channel being displayed. For example, if a particular channel or TV program is being displayed, an application that is related to that channel or TV program (or an application that is tailored to provide content related to that channel or TV program) may be downloaded for execution by the application module 422. For example, a TV program such as "60 Minutes" may have an application that is configured to display to a viewer additional information about the news stories being reported. In some implementations, an application is automatically downloaded if the CAM 106 or the server 112 determines that a particular TV program is being displayed. In some implementations, an application is downloaded in response to a viewer's selection of the application.

In some implementations, the application module 422 invokes an application 424-i and also directs the invoked application 424-i to download one or more related digital content items from a remote source, such as a server 112. For example, the application module 422 may invoke a feed reader module to cause the feed reader device to download content items relating to an actor in a show being displayed (such as posts about the actor from an entertainment web site). In another example, the application module 422 may generate instructions to invoke a browser and instructions to cause the browser to navigate to a particular website (e.g., a product website) or a wiki related to the channel or content associated with a program being displayed.

Figure 6:
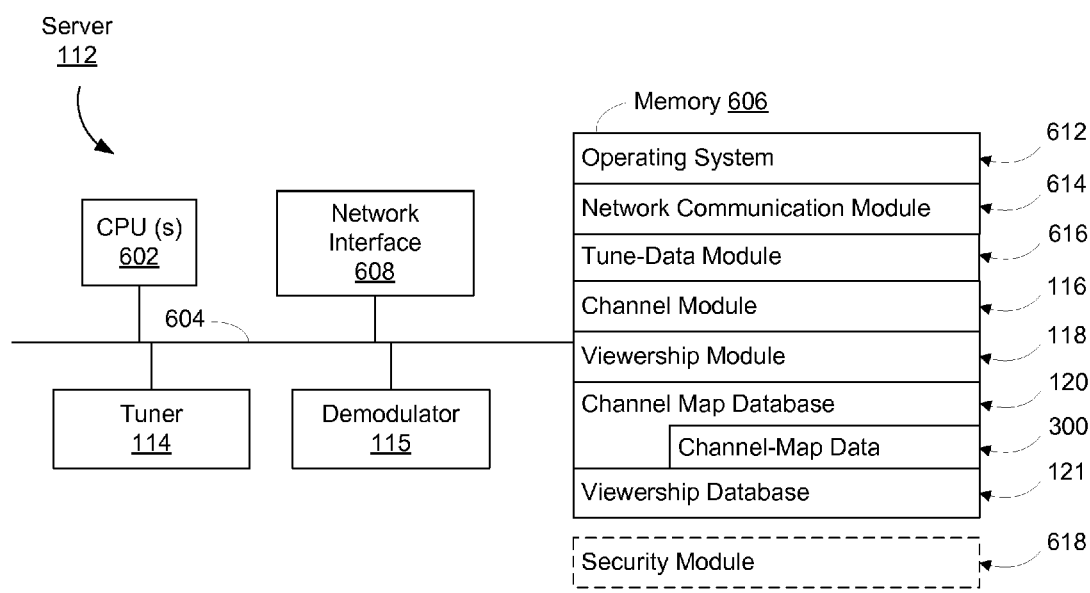
FIG. 6 is a block diagram illustrating a structure of a server, in accordance with some implementations.

FIG. 6 is a block diagram illustrating one implementation of a server 112. The server 112 is an electronic device that includes one or more processing units (CPU(s)) 602, one or more network or other communications interfaces 608, a tuner 114, a demodulator 115, memory 606, and one or more communication buses 604 for interconnecting these components.

In some implementations, the tuner 114 is connected to one or more antennas configured to receive the TV signals 108. The antennas are thus configured to receive over-the-air broadcast signals and/or satellite broadcast signals. The tuner 114 is configured to focus on and isolate certain frequencies (or frequency ranges) that correspond to particular TV channels. As described in greater detail herein with reference to FIG. 9, the channel module 116 uses information from the tuner 114 to correlate a received TV signal 108 with a particular TV channel.

In some implementations, after tuning to one of the TV signals 108, the tuner 114 sends the tuned TV signal to a demodulator 115. The demodulator 115 extracts or recovers one or more data streams from the TV signal. A data stream contains video and/or audio content corresponding to a TV channel. In some implementations, the data stream includes one or more video sub-streams and one or more audio sub-streams corresponding to the TV channel.

As described above, a data stream from the demodulator 115 includes program map messages containing a program number 202 and a component packet identifier 204 associated with the TV channel being displayed to a user. These components of the data stream can be extracted and used by the tune-data module 616 as described herein.

The memory 606 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 606 may optionally include one or more storage devices remotely located from the CPU(s) 602. The memory 606, including the non-volatile and volatile memory device (s) within the memory 606, comprises a computer readable storage medium. In some implementations, the memory 606 or the non-transitory computer readable storage medium of the memory 606 stores the following programs, modules and data structures, or a subset thereof including an operating system 612, a network communication module 614, a tune-data module 616, a channel module 116, a viewership module 118, a channel map database 120, a viewership database 121, and optionally a security module 618.

The operating system 612 includes procedures for handling various basic system services and for performing hardware dependent tasks.

The network communication module 614 facilitates communication with other devices via the one or more communication network interfaces 608 (wired or wireless) and one or more communication networks, such as the Internet 124, other wide area networks, local area networks, metropolitan area networks, and so on.

The tune-data module 616 receives a data stream from the demodulator 115, and extracts a program number 202 and one or more component packet identifiers 204 from the program map messages. The program number 202 and the component packet identifiers 204 can then be stored in the channel map database 120 in conjunction with data from the tuner 114. For example, when the tuner 114 is tuned to a particular frequency, the tuning parameters of the tuner 114 can be used to identify the TV channel (e.g., the TV channel number) carried by the particular frequency. Accordingly, the tune-data module 616 can store the TV channel number in conjunction with the program number 202 and the component packet identifiers 204 in the channel map database 120.

In some implementations, each data stream from the demodulator 115 includes tuned-channel meta-information 134 corresponding to the channel and/or the TV program carried by the data stream. Accordingly, the tune-data module 616 can store the tuned-channel meta-information 134 (including channel information and TV program information) in the channel map database 120 in conjunction with the program number 202 and the component packet identifiers 204.

Thus, the channel map database 120 stores data that correlates channel information and TV program information with program numbers 202 and component packet identifiers 204. When a tune-data message 110 containing a program number 202 and component packet identifiers 204 is received by the server 112, the channel map database 120 can be consulted to provide substantial information about the channel associated with the received tune-data message 110.

The correlation between TV channels and Muxes, program numbers, and component packet identifiers is often specific to different geographic areas. In some implementations, multiple servers in multiple geographic areas are implemented in order to develop a comprehensive channel map database 120, or multiple, regional channel map databases. Accordingly, the program number 202 and the component packet identifiers 204 can be stored in the channel map database 120 in conjunction with the name of the TV network carried by the tuned TV signal in a particular geographic region. An implementation of the channel-map data 300 in the channel map database 120 is described above with reference to FIG. 3.

In some implementations, the channel module 116 receives a tune-data message 110 from a CAM 106, which is associated with the display device 104. The channel module 116 uses the tune-data message 110 to determine what channel is being displayed on the display device 104. In some implementations, the channel module 116 uses the information in the tune-data message 110 and the information in the channel map database 120 (e.g., channel-map data 300) to determine the channel that corresponds to that particular tune-data message 110, and therefore, what channel is being displayed to a user on the display device 104. In some implementations, the channel module 116 compares the program number 202 and/or component packet identifiers 204 from the tune-data message 110 to program numbers and/or component packet identifiers stored in the channel map database 120 to determine the channel corresponding to the tune-data message 110.

In some implementations, the channel module 116 sends to the CAM 106 return data 122 (e.g., via the Internet 124). In some implementations, the return data 122 is associated with the TV channel identified by the tune-data message 110. In some implementations, the return data 122 includes TV viewership data, closed caption streams, subtitle streams, alternate language audio tracks, and/or program recommendations.

The viewership module 118 receives tune-data messages 110 from the CAM 106, and stores tune-data messages 110, or information from the tune-data messages 110, in the viewership database 121. In some implementations, the stored information (from the tune-data messages 110) is associated with an indicator of the channel corresponding to the respective tune-data message 110. For example, a tune-data message 110, which alone does not necessarily contain a convenient, unique indicator of the TV channel associated with the tune-data message 110, is stored in the viewership database 121 in association with a TV channel number or TV network name. Accordingly, viewership data in the viewership database 121 can be organized for storing channel viewership statistics and/or program viewership statistics for a specific TV network. Such data may be used, for example, in determining the popularity of TV shows or networks, determining advertising prices based on viewership data, and/or reporting popularity metrics to interested parties, such as viewers and TV networks.

In some implementations, stored information (from the tune-data messages 110) is associated with a unique identifier for the respective CAM 106 (e.g., CAM identifier 210) that sent each respective tune-data message 110. In other words, the viewership data is organized for storing viewing statistics (channel and/or program viewership statistics) of particular users or households.

As described above, in some implementations, the CAM 106 includes a security module 426 that encrypts or otherwise limits unauthorized access to the tune-data message 110. Accordingly, in some implementations, the server 112 includes a security module 618 for decrypting a tune-data message 110 that was encrypted or otherwise protected before transmission by the CAM 106.

Figure 7:
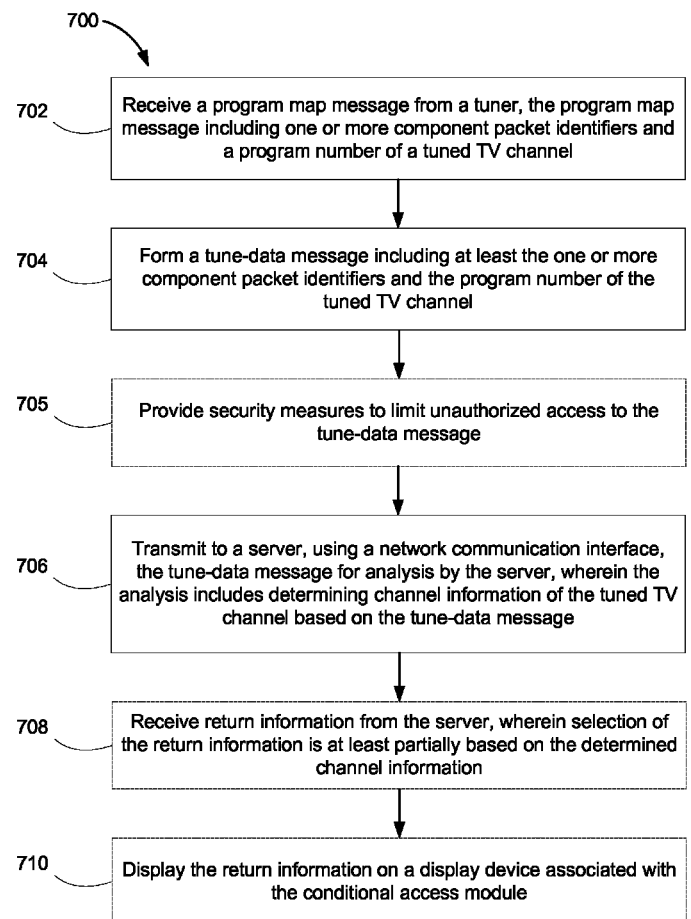
FIG. 7 is a flow chart illustrating a process of forming a tune-data message, in accordance with some implementations.

Attention is now directed to FIG. 7, which is a flow diagram illustrating a process 700 of forming a tune-data message at a conditional access module, according to some implementations. Such methods may be useful for entities desiring to receive and track viewership statistics of viewers who have agreed to have their TV viewership monitored.

The method 700 is performed at a conditional access module 106 having one or more processors and memory. In some implementations, the method 700 is performed by the tune-data message module 418. A program map message is received (702) from a tuner. The program map message includes one or more component packet identifiers and a program number of a tuned TV channel. In some implementations, the program map message and the component packet identifiers are associated with a TV channel being displayed on a display device 104 (or recorded on a recording device) associated with the CAM 106.

A tune-data message is formed (704) including at least the one or more component packet identifiers and the program number of the tuned TV channel. In some implementations, the tune-data message includes a unique or semi-unique CAM identifier 210, a geographic location identifier 212, and a time stamp 214. In some implementations, the geographic location identifier 212 is provided by the location module 420.

In some implementations, the security module 426 provides (705) security measures to limit unauthorized access to the tune-data message. For example, some implementations provide for the tune-data message 110 to be encrypted according to known data encryption techniques.

The tune-data message is transmitted (706) to a server (e.g., by the network communication module 414), for analysis by the server. In some implementations, the analysis includes determining channel information of the tuned TV channel based on the tune-data message. For example, in some implementations, the server analyzes the tune-data message including the program number 202 and the one or more component packet identifiers 204 and determines the TV channel number and/or the TV network name associated with the tune-data message. Accordingly, the server can use the tune-data message to determine the TV channel associated with the program map message, and thus the TV channel being displayed on a display device 104 (or recorded on a recording device) associated with the CAM 106.

In some implementations, the CAM receives (708) return information (e.g., the return data 122) from the server. In some implementations, the return information includes TV viewership data, closed caption streams, subtitle streams, alternate language audio tracks, and/or program recommendations. In some implementations, the above described information items are displayed on a display device associated with the conditional access module (e.g., the display device 104). In some implementations, selection of the return information is at least partially based on the determined channel information.

In some implementations, tune-data messages 110 are transmitted to the server at predetermined times or intervals. For example, in some implementations, a tune-data message 110 is transmitted to the server when a user changes the channel that is being tuned or displayed by the display device 104. In some implementations, a tune-data message is transmitted to the server at predetermined intervals of time (e.g., every 1, 5, or 10 minutes, or at the "top" or "middle" of every hour), or when a displayed TV channel transitions from one program to another program.

Figure 8A:
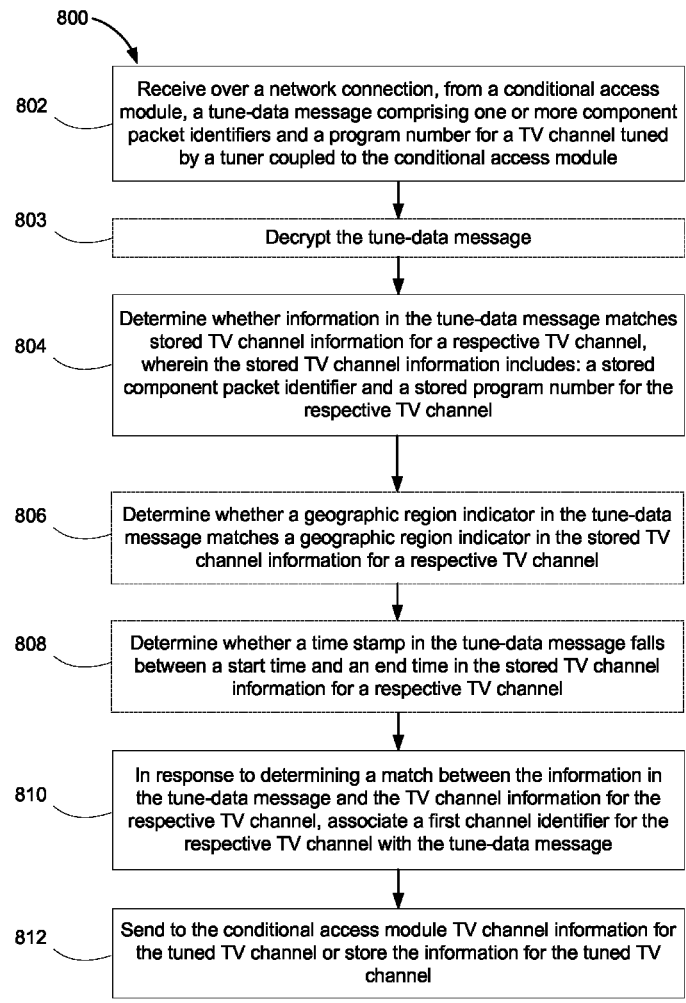
FIGS. 8A-B are flow charts illustrating processes of determining channel information from a tune-data message, in accordance with some implementations.

Attention is now directed to FIG. 8A, which is a flow diagram illustrating a process 800 of determining channel information associated with a received tune-data message, according to some implementations. Such methods may be useful for entities desiring to track viewership statistics of viewers who have agreed to have their TV viewership monitored.

The method 800 is performed at a server 112 having one or more processors and memory. In some implementations, the method 800 is performed by the channel module 116. A tune-data message is received (802) from a conditional access module (over a network connection.) As described above, the tune-data message comprises one or more component packet identifiers and a program number for a TV channel tuned by a tuner coupled to the conditional access module.

In some implementations, the tune-data message received from the conditional access module (e.g., CAM 106) is encrypted. Accordingly, in some implementations, the tune-data message is decrypted (803) by the security module 618. For example, some implementations provide for the tune-data message 110 to be decrypted in accordance with the particular data encryption technique used by the CAM 106.

It is determined (804) whether information in the tune-data message matches stored TV channel information for a respective TV channel. The stored TV channel information includes: a stored component packet identifier and a stored program number for the respective TV channel.

For example, the server 112 receives a tune-data message 110 including one or more component packet identifiers 204 and the program number 202, which correspond to a data stream 130 received by the CAM 106. The server 112 (e.g., the channel module 116) determines whether information in one of the tune-data entries 312 in the channel map database 120 matches the information in the tune-data message 110. Specifically, the server 112 determines whether a tune-data entry 312 contains a program number 202 and one or more component program identifiers 204 that match a program number 202 and one or more component program identifiers 204 contained in the tune-data message 110.

In some implementations, the server 112 (e.g., the channel module 116) determines (806) whether a geographic region indicator 302 in the tune-data message 110 matches a geographic region indicator 302 in the stored TV channel information (e.g., a tune-data entry 312 in the channel map database 120). In some implementations, the server 112 (e.g., the channel module 116) determines (808) whether a timestamp 214 in the tune-data message 110 falls between a start time 308 and an end time 310 in the stored TV channel information (e.g., a tune-data entry 312 in the channel map database 120).

In response to determining a match between the information in the tune-data message and the TV channel information for the respective TV channel, a first channel identifier for the respective TV channel is associated (810) with the tune-data message. In some implementations, the tune-data message 110 or information from the tune-data message 110 is stored in the viewership database 121 (e.g., by the viewership module) in association with a channel identifier, such as a TV channel number or TV network name.

TV channel information for the tuned TV channel is stored or sent to the conditional access module (812). For example, in some implementations, TV channel information such as viewership data or meta-information is sent as return data 122 to the CAM 106. In some implementations, the CAM 106 displays information items or executes applications 424 in accordance with the information in the return data 122.

Figure 8B:
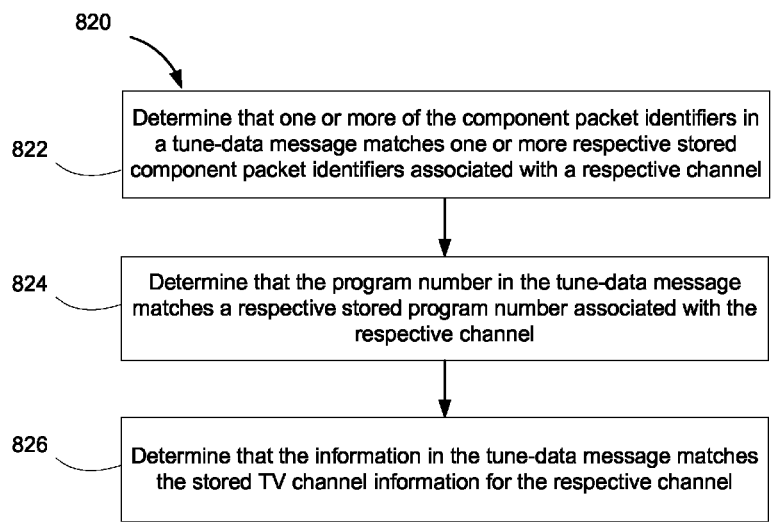

FIG. 8B is a flow diagram illustrating a process 820 of determining a match between stored channel information for a respective TV channel and information in a tune-data message. In some implementations, the server 112 determines that one or more of the component packet identifiers in a tune-data message matches (822) one or more respective stored component packet identifiers associated with a respective channel. The server 112 determines that the program number in the tune-data message matches (824) a respective stored program number associated with the respective channel. Stored component packet identifiers and stored program numbers are, in some implementations, stored in the tune-data entries 312 of the channel-map data 300. Responsive to determining a match in steps (822) and (824), it is determined that information in the tune-data message matches the stored TV channel information for the respective channel. In some implementations, this process is used in order to increase the likelihood that a correct match is determined between a displayed TV channel and a specific channel identifier. For example, when multiple TV channels use overlapping component program identifiers, it can be helpful to disambiguate between the multiple TV channels to determine which one corresponds to the TV channel actually being displayed. Thus, if both the component packet identifiers (e.g., component packet identifiers 204) and the program number (e.g., a program number 202) in a tune-data message match the component packet identifiers and the program number in a respective tune-data entry 312, it is more likely that the tune-data message (and thus the displayed TV channel) corresponds to the TV channel associated with the matched tune-data entry.

Figure 9:
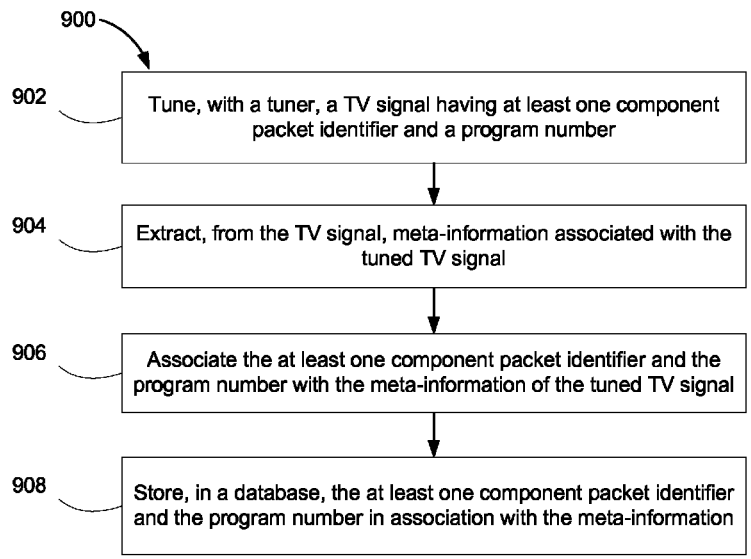
FIG. 9 is a flow chart illustrating a process of determining channel information from a tuned TV signal, in accordance with some implementations.

Attention is now directed to FIG. 9, which is a flow diagram illustrating a process 900 of determining channel information associated with a tuned TV signal, according to some implementations. Such methods may be useful for entities desiring to identify, compile, and store TV channel data.

The method 900 is performed at a server 112 having one or more processors and memory. In some implementations, the method 900 is performed by the channel module 116. A TV signal having at least one component packet identifier and a program number is tuned (902) with a tuner. In some implementations, after tuning to one of the TV signals 108, the TV tuner 114 sends the tuned TV signal to a demodulator 115. The demodulator 115 extracts or recovers a data stream from the TV signal, where the data stream includes at least one component packet identifier and a program number.

Meta-information associated with the tuned TV signal is extracted (904). For example, when a tuned TV signal is received at a device with a tuner, meta-information associated with the tuned TV signal is often included in one or more data streams (or data sub-streams) received through the tuner. Accordingly, meta-information, such as channel information (e.g., TV channel number, TV channel name, etc.) and/or TV program information (e.g., program name, program description, etc.).

Also, when a tuner is tuned to a particular frequency, the tuning parameters of the tuner can be used to identify the TV channel (e.g., the TV channel number) carried by the particular tuned frequency. Accordingly, the channel module 116 can determine, from tuning parameters of the TV tuner 114, the TV channel number associated with a particular data stream, and therefore, with a particular combination of a program number 202 and one or more component packet identifiers 204.

The at least one component packet identifier and the program number from the tune TV signal are associated (906) with the meta-information of the tuned TV signal. The at least one component packet identifier and the program number are stored (908) in association with the meta-information. In some implementations, they are stored in the channel map database 120. In some implementations, the channel module 116 also determines and stores in the channel map database 120 a geographic region indicator 302 associated with the location of the TV tuner 114. In some implementations, a network name 304, a MUX identifier 306, a start time 308 and an end time 310 are also stored in association with the channel number 305.

Each of the methods described herein may be governed by instructions that are stored in a non-transitory computer readable storage medium and that are executed by one or more processors of one or more electronic devices (e.g., CAM 106, server 112). Each of the operations shown in FIGS. 6-8 may correspond to instructions stored in a computer memory or computer readable storage medium.

The foregoing description, for purpose of explanation, has been described with reference to specific implementations. However, the illustrative discussions above are not intended to be exhaustive or to limit the disclosed ideas to the precise forms disclosed. Many modifications and variations are possible in view of the above teachings. The implementations were chosen and described in order to best explain the principles and practical applications of the disclosed ideas, to thereby enable others skilled in the art to best utilize them in various implementations with various modifications as are suited to the particular use contemplated.

Moreover, in the preceding description, numerous specific details are set forth to provide a thorough understanding of the presented ideas. However, it will be apparent to one of ordinary skill in the art that these ideas may be practiced without these particular details. In other instances, methods, procedures, components, and networks that are well known to those of ordinary skill in the art are not described in detail to avoid obscuring aspects of the ideas presented herein.

What is claimed is:

1. A method for determining a channel being displayed, comprising:
    at a conditional access module coupled to a tuner and having a network communication interface:
        receiving, from a first multiplexed data stream, a first program number, and a first component packet identifier identifying a first sub-stream of the first multiplexed data stream, the first sub-stream corresponding to a first TV channel;
        forming a tune-data message that includes the first program number and the first component packet identifier, wherein forming the tune-data message includes applying security measures that limit unauthorized access to the tune-data message;
        transmitting the tune-data message to a server using the network communication interface; and
        receiving, from the server, TV channel information for the first TV channel, transmitted by the server responsive to comparing the first program number and the first component packet identifier of the tune-data message to (i) the first program and the first component packet identifier extracted by the server from the first sub-stream of the first multiplexed data stream and associated with the first TV channel, and (ii) a second program identifier and the first component packet identifier extracted b the server from a second sub-stream of a second multiplexed data stream and associated with a second TV channel, and identifying a match between data of the tune-data message and data associated with the first TV channel.

2. The method of claim 1, wherein the network communication interface is configured to communicate over a wireless network.

3. The method of claim 2, wherein the wireless network is selected from the group consisting of a wifi network and a cellular data network.

4. The method of claim 1, further comprising:
providing, for display on a display device, a network communication setup interface including one or more user selectable configuration options;
receiving one or more configuration option selections;
configuring the network communication interface in accordance with the one or more received configuration option selections.

5. The method of claim 1, wherein the first program number is unique within one of a plurality of collections of channels.

6. The method of claim 1, wherein the tune-data message transmitted to the server includes an identifier for the conditional access module.

7. The method of claim 6, wherein the identifier for the conditional access module is selected from the group consisting of an IP address, a MAC address, and a user identifier.

8. The method of claim 1, wherein the transmitting occurs in response to a determination that the tuned TV channel has been tuned for a duration greater than a predefined threshold.

9. The method of claim 1, further comprising at the conditional access module:
displaying the TV channel information for the first TV channel on a display device associated with the conditional access module.

10. The method of claim 1, further comprising:
outputting the data stream to a display device configured to display TV signals.

11. The method of claim 1, wherein the conditional access module is associated with a panelist who is part of a viewership measurement program.

12. The method of claim 1, wherein the transmitting recurs on a predetermined interval.

13. The method of claim 12, wherein the predetermined interval is one minute.

14. A conditional access module, comprising:
one or more processors;
memory coupled to the one or more processors;
a network communication interface; and
one or more programs, stored in the memory, configured for execution by the one or more processors, the one or more programs comprising instructions to:
receive, from a first multiplexed data stream, a first program number, and a first component packet identifier identifying a first sub-stream of the first multiplexed data stream, the first sub-stream corresponding to a first TV channel;
form a tune-data message that includes the first program number and the first component packet identifier, wherein forming the tune-data message includes applying security measures that limit unauthorized access to the tune-data message;
transmit the tune-data message to a server using the network communication interface; and
receive, from the server, TV channel information for the first TV channel, transmitted by the server responsive to comparing the first program number and the first component packet identifier of the tune-data message to (i) the first program and the first component packet identifier extracted by the server from the first sub-stream of the first multiplexed data stream and associated with the first TV channel, and (ii) a second program identifier and the first component packet identifier extracted by the server from a second sub-stream of a second multiplexed data stream and associated with a second TV channel, and identifying a match between data of the tune-data message and data associated with the first TV channel.

15. A non-transitory computer readable storage medium and one or more computer programs embedded therein, the computer programs, which when executed by a conditional access module, cause the conditional access module to:
receive, from a first multiplexed data stream, a first program number, and a first component packet identifier identifying a first sub-stream of the first multiplexed data stream, the first sub-stream corresponding to a first TV channel;
form a tune-data message that includes the first program number and the first component packet identifier, wherein forming the tune-data message includes applying security measures that limit unauthorized access to the tune-data message;
transmit the tune-data message to a server using a network communication interface; and
receive, from the server, TV channel information for the first TV channel, transmitted by the server responsive to comparing the first program number and the first component packet identifier of the tune-data message to (i) the first program and the first component packet identifier extracted by the server from the first sub-stream of the first multiplexed data stream and associated with the first TV channel, and (ii) a second program identifier and the first component packet identifier extracted by the server from a second sub-stream of a second multiplexed data stream and associated with a second TV channel, and identifying a match between data of the tune-data message and data associated with the first TV channel.

16. A method for determining a channel being displayed, comprising:
at a server with a processor and memory:
extracting, from a plurality of multiplexed data streams of a received TV signal, a first multiplexed data stream identified by a first program number, the first multiplexed data stream comprising a first sub-stream corresponding to a first TV channel, the first sub-stream identified by a first component packet identifier;
extracting, from the plurality of multiplexed data streams of the received TV signal, a second multiplexed data stream identified by a second program number, the second multiplexed data stream comprising a second sub-stream corresponding to a second TV channel, the second sub-stream identified by the first component packet identifier;
receiving over a network connection, from a conditional access module, an encrypted tune-data message including the first program number and the first component packet identifiers;
decrypting the tune-data message to access the first program number and the first component packet identifier;

matching the first program number and the first component packet identifier accessed from the tune-data message to stored TV channel information for the first TV channel, the stored TV channel information for the first TV channel including the first stored program number and the first stored component packet identifier;

associating, in response to the matching, the stored TV channel information for the first TV channel with the first program number and the first component packet identifier; and sending, to the conditional access module, the stored TV channel information for the first TV channel.

17. The method of claim 16, wherein the stored TV channel information includes a first geographic location corresponding to the first TV channel, and wherein the matching further comprises matching the first geographic location to a determined geographic location of the conditional access module.

18. The method of claim 17, wherein the geographic location of the conditional access module is determined by one or more of IP address tracing and cellular triangulation.

19. The method of claim 17, wherein the determined geographic location of the conditional access module is specified by a geographic location identifier received from the conditional access module.

20. The method of claim 16, further comprising receiving a time stamp corresponding to a display time of the tuned content.

21. The method of claim 20, further comprising:
determining a program being displayed on a display device associated with the conditional access module based at least in part on the stored TV channel information for the tuned content and the time stamp.

22. The method of claim 20, wherein the stored TV channel information further includes a start time and an end time of the first TV channel, and wherein the matching further comprises determining that the time stamp falls between the start time and the end time.

23. The method of claim 16, further comprising:
extracting, from the plurality of multiplexed data streams of the received TV signal, a third multiplexed data stream identified by the first program number, the third multiplexed data stream comprising a third sub-stream corresponding to a third TV channel, the third sub-stream identified by a second component packet identifier;
matching the first program number and the second component packet identifier, accessed from a decrypted second tune-data message received over the network connection from the conditional access module, to stored TV channel information for the third TV channel; and
sending, to the conditional access module, the stored TV channel information for the third TV channel, responsive to matching the first program number and the second component packet identifier to stored TV channel information for the third TV channel.

24. The method of claim 16, wherein the conditional access module does not extract a TV channel identifier from the plurality of multiplexed data streams.

25. A computer system, comprising:
one or more processors;
memory coupled to the one or more processors; and
one or more programs, stored in the memory, configured for execution by the one or more processors, the one or more programs comprising instructions to:
extract, from a plurality of multiplexed data streams of a received TV signal, a first multiplexed data stream identified by a first program number, the first multiplexed data stream comprising a first sub-stream corresponding to a first TV channel, the first sub-stream identified by a first component packet identifier;
extract, from the plurality of multiplexed data streams of the received TV signal, a second multiplexed data stream identified by a second program number, the second multiplexed data stream comprising a second sub-stream corresponding to a second TV channel, the second sub-stream identified by the first component packet identifier;
receive over a network connection, from a conditional access module, an encrypted tune-data message including the first and the first component packet identifier;
decrypt the tune-data message to access the first program number and the first component packet identifier;
match the first program number and the first component packet identifier accessed from the tune-data message to stored TV channel information for the first TV channel, the stored TV channel information for the first TV channel including the first stored program number and the first stored component packet identifier;
associating, in response to the matching, the stored TV channel information for the first TV channel with the first program number and the first component packet identifier; and
send, to the conditional access module, the stored TV channel information for the first TV channel.

26. A non-transitory computer readable storage medium and one or more computer programs embedded therein, the computer programs comprising instructions, which when executed by a computer system cause the computer system to:
extract, from a plurality of multiplexed data streams of a received TV signal, a first multiplexed data stream identified by a first program number, the first multiplexed data stream comprising a first sub-stream corresponding to a first TV channel, the first sub-stream identified by a first component packet identifier;
extract, from the plurality of multiplexed data streams of the received TV signal, a second multiplexed data stream identified by a second program number, the second multiplexed data stream comprising a second sub-stream corresponding to a second TV channel, the second sub-stream identified by the first component packet identifier;
receive over a network connection, from a conditional access module, an encrypted tune-data message including the first and the first component packet identifier;
decrypt the tune-data message to access the first program number and the first component packet identifier;
match the first program number and the first component packet identifier accessed from the tune-data message to stored TV channel information for the first TV channel, the stored TV channel information for the first TV channel including the first stored program number and the first stored component packet identifier;
associating, in response to the matching, the stored TV channel information for the first TV channel with the first program number and the first component packet identifier; and
send, to the conditional access module, the stored TV channel information for the first TV channel.

* * * * *